Patented Jan. 8, 1946

2,392,710

UNITED STATES PATENT OFFICE 2,392,710

MANUFACTURE OF INTERPOLYMERS

Leslie Ernest Wakeford and Donald Helmsley Hewitt, Homerton, London, England

No Drawing. Application July 30, 1943, Serial No. 496,780. In Great Britain July 28, 1942

6 Claims. (Cl. 260—23)

This invention relates to the manufacture of interpolymers of aromatic vinyl hydrocarbons with other polymerisable organic compounds, in particular those containing fatty acid radicles, and of coating compositions containing the said interpolymers.

It has been proposed to employ polymerisation products derived from aromatic vinyl hydrocarbons, especially polystyrene, for the preparation of film forming compositions, such as varnishes, lacquers and paints. Polystyrene itself may be dissolved in a suitable solvent, such as naphtha, but the films obtained from the solution are lacking in durability; to overcome this defect it has been proposed to add various plasticising substances to the polystyrene solution, but even with such additions and when using a high molecular weight polystyrene it has proved very difficult, if not impossible, to produce such modifications in the product as to enable films of great durability to be obtained therefrom. Another disadvantage of polystyrene, which it shares with nitro-cellulose, is the very high viscosity of its solutions and consequently the thinness of the coats which can be obtained from such solutions by the usual methods. Thus the usefulness of polystyrene as a varnish or paint material is greatly limited by the characteristics above mentioned.

It has been proposed to manufacture resinous substances suitable for the production of coating compositions by mixing a polymerisable vinyl compound, such as vinyl esters, vinyl chloride or styrene with an unpolymerised, unoxidised drying oil and effecting polymerisation of the vinyl compound in absence of water and preferably in the presence of a common solvent for the ingredients. By this method it has not been found possible to incorporate readily into monomeric styrene more than 25 per cent of its weight of linseed oil if clear films are to be obtained nor more than a similar weight of China-wood oil in order to obtain a product stable on storage. Further the durability of the resultant products, though better than that of the unmodified polystyrene of corresponding molecular weight, is still not sufficiently satisfactory for external use. The solubility characteristics of the resulting products are not substantially improved. Moreover the reaction times necessary are very long.

In order to provide products of improved solubility it has also previously been proposed to manufacture polymeric products from aromatic vinyl hydrocarbons, such as styrene, by reacting them with aromatic hydroxy compounds and/or ethers thereof in the presence of acid reacting substances capable of splitting off acid and capable of accelerating the polymerisation of pure styrene; the reaction products from aromatic vinyl hydrocarbons and such aromatic hydroxy compounds as contain a free para-position with respect to the hydroxy group were stated to be capable of being homogeneously combined with polymerised linseed or wood oils, and hence to be suitable for the preparation of lacquers or as additions for other lacquer forming products such as oil lacquers and cellulose derivatives.

Another process that has been proposed for the production of synthetic resins suitable for the manufacture of varnish compositions comprised heating together a phenol, an aromatic hydrocarbon carrying a vinyl group attached directly to the aromatic nucleus, such as styrene, and a drying or semi-drying oil, untreated or heat treated or air blown.

It has also been proposed to prepare an oil-soluble polystyrene resinous product by adding to a styrene monomer an oil-soluble phenolic resin prepared from an alkyl- or aryl-substituted phenol and polymerising the mixture. In a modification of this process there might also be present in the reaction mixture of styrene and resin a proportion of drying or semi-drying oil which appeared to assist in the prevention of the long chain polymerisation of the styrene.

Further for the manufacture of synthetic resinous interpolymers of styrene with drying oil varnishes it has been proposed to heat styrene with the product obtained by heat blending a frosting drying oil, such as China-wood oil, either in the raw state or after it has been blown or bodied, with a small proportion of a varnish gum or resin. The styrene oil varnish resins so produced were stated to be useful as coating compositions.

The present invention has for its object to effect the production of improved polymerisation products from aromatic vinyl compounds, such as styrene, which possess valuable properties, especially in their utilisation as coating compositions, and are not subject to the various disadvantages previously mentioned that have been experienced in connection with the employment as film-forming materials of solutions or compositions containing polymerised styrene or other aromatic vinyl hydrocarbons as previously prepared in the art. For this purpose the present invention comprises a process for the production of compatible soluble interpolymers of aromatic vinyl hydrocarbons with mixed polyhydric alcoholic esters containing substantial proportions of unsaturated fatty acid radicles, which process consists in first subjecting a composition comprising mixed polyhydric alcoholic esters, or a mixture of two or more such compositions, to a polymerising heat treatment so as to produce a partially polymerised product having a desired predetermined degree of polymerisation, thereupon adding an aromatic vinyl hydrocarbon to the partially polymerised polyhydric alcoholic esters and then subjecting the mixture of the said materials to a further polymerisation treatment in the presence or absence of a suitable common solvent for the several ingredients. Preferably the last mentioned polymerisation is effected by heating the mixture to an appropriate temperature until clear soluble products are obtained in which substantially all the aromatic vinyl hydrocarbon is combined.

Of the aromatic vinyl hydrocarbons, that of most particular interest for the purposes of the present invention is styrene, and as an example of the mixed polyhydric alcoholic esters there may be instanced those formed from glycerol and the fatty acids of drying oils. As examples of other suitable mixed polyhydric alcoholic esters for use in carrying out the present process, there may be mentioned those in which the glycerol is replaced by penta-erythritol, mannitol or sorbitol, whilst in place of part of the fatty acids of drying oils there may be used the fatty acids of semi-drying or non-drying oils, or the acids of natural gums such as rosin or copal; alternatively there may be employed as the mixed polyhydric alcoholic esters those formed from glycerol (or other polyhydric alcohol), one or more of the groups of acids above mentioned and a polybasic acid (or anhydride thereof) such as maleic or phthalic acid.

Further a natural or synthetic gum may be heat blended with the partially polymerised mixed polyhydric alcoholic esters at a temperature not below about 225° C. and after addition of the vinyl hydrocarbon to the product so obtained the whole is then subjected to the further polymerisation treatment.

The partial polymerisation of the mixed polyhydric alcoholic esters is effected by the application of heat, preferably at temperatures between about 150° C. to 300° C., and in the presence or absence of polymerisation catalysts, such as air, oxygen, benzoylperoxide, sulphur dioxide metallic soaps or anthraquinone.

The degree to which the mixed ester should be polymerised prior to addition thereto of the aromatic vinyl hydrocarbon depends largely on the composition of the ester; this degree of polymerisation can be varied within limits determined by the necessity for allowing sufficient prior polymerisation to give homogeneous solutions of the final product which will yield stable final products. In general the ability of any partially polymerised mixed ester to enter into a reaction with styrene under the special conditions appears to be related to its gelation time measured by heating the aforementioned ester in a boiling tube immersed in a bath at 300° C. and measuring the time taken to gel throughout. These points are brought out in the following example:

*Example 1*

50 parts polymeric mixed ester, 50 parts styrene and 100 parts xylol (all the parts being by weight) were heated under reflux with the following results:

| Nature of mixed ester | Gelation time of mixed ester | Reaction time of mixed ester and styrene in xylol solution | Nature of film produced from the final reaction product | Viscosity of final product |
|---|---|---|---|---|
| | *Minutes* | *Hours* | | *Seconds* |
| (a) 30 poise linseed stand oil | 180 | 24 | Slow drying, cloudy film | 42 |
| (b) 11 poise dehydrated castor oil | 120 | 10 | Quick drying clear film | 180 |
| (c) 45 poise dehydrated castor oil | 60 | 8 | Quick drying clear film | 730 |

In the first column of the above table, the viscosity of the linseed stand oil and dehydrated castor oil is given in poises at 25° C. whilst in the last column of the table the viscosity of the final product was measured at 25° C. in the Ford No. 4 cup. It will be seen that the two dehydrated castor oils polymerised to 11 and 45 poises respectively are especially valuable for use in the process according to the present invention.

In the co-polymerisation of alkyd resins with styrene, good compatibility and complete reaction can be obtained with alkyd resins of varying oil lengths. As the oil length increases the reaction time between the alkyd resin and the styrene increases. Different oil length alkyd resins, however, must be heated for different times to obtain the necessary degree of polymerisation that will allow them to be successfully used for subsequent copolymerisation with styrene. Furthermore it is to be remarked that alkyd resins based on maleic anhydride copolymerise very much more readily than the corresponding resins based on phthalic anhydride.

By a determination of the percentage of combined styrene in the copolymer by the increase in solids of the reaction mixture it is possible to follow the progress of the reaction. To obtain clarity of films and stability of the solution it is preferable to take the reaction to the point where a high proportion of the styrene is polymerised. With the more reactive mixed polymeric esters it is not, however, always possible for the reaction to proceed to this extent before gelation of the final product occurs.

The relative quantities of styrene and mixed polymeric ester depend upon the particular result required and the nature of the mixed polymeric ester. As the quantity of mixed polymeric ester is progressively decreased the resulting products more nearly resemble unmodified polystyrene although of modified molecular weight characteristics. Increase in the mixed polymeric ester beyond a weight equal to that of the styrene leads in the case of polymerised oils to a tendency to give films which are slow drying, but in the case of alkyd resins, which are themselves more rapid drying, this tendency is not so noticeable.

The reaction between the aromatic vinyl hydrocarbon and the partially polymerised polyhydric esters proceeds favourably in solution in an inert solvent such as toluene, xylene or ethyl benzene. Surprisingly it has also been found that other solvents may be used including mineral spirit and turpentine, both of which yield products differing in properties from those resulting from reaction in xylol solution; in certain cases use of these solvents may yield homogeneous solutions of reaction products of particular value in the manufacture of paints, varnishes and the like.

The following example, in which the various parts given are by weight, illustrates the effect of different solvents upon the reaction in question:

Example 2

25 parts of dehydrated castor oil polymerised to a viscosity at 25° C. of 11 poises, 25 parts of styrene, and 50 parts of solvent were heated under reflux with the following results:

| Solvent | Time of reaction | Solids of final product | Viscosity of final product [1] |
|---|---|---|---|
| | Hours | Per cent | Seconds |
| Turpentine | 21 | 56 | 190 |
| Xylol | 10½ | 44 | 180 |
| Mineral spirits | 7 | 41 | 210 |

[1] Measured at 25° C. in Ford No. 4 Cup.

With the addition of a drier to the solutions finally obtained it was found that they all yielded tough clear films.

Analysis of the three products obtained according to the above example shows some variation in the mechanism of the reaction. In the case of turpentine for example the solvent appears to take part in the co-polymerisation. It should be noted however that the film formed from the product produced in turpentine solutions was in no way inferior to the other films. In the case of mineral spirits a very viscous solution resulted with a comparatively low polymerisation of styrene. Reduction of the initial concentration of the oil and styrene to below 50 per cent gave a more suitable product with a higher percentage polymerisation. In all solvents however it was found that continued heating always resulted in rapid increase in viscosity and eventual gelation of the final product.

With regard to the effect of concentration in carrying out the reaction between the aromatic vinyl hydrocarbon and the partially polymerised polyhydric esters, the proportion of reactants to solvent is preferably such that, on the complete polymerisation of the styrene, the final reaction mixture obtained showed a total solids content of 50 per cent. Other ratios of reactants to solvent can be used however, and if the amount of solvent is reduced the time required to polymerise all the styrene is also reduced. However, on thinning the varnish to 50 per cent solids, it is found that the viscosity is rather high. With less solvent present the reaction mixture was also more easily gelled, and incompatibility of the reactants tended to increase.

The following example illustrates the effect upon the reaction in question of alterations in concentration of the reactants in the solution; all the parts mentioned being by weight:

Example 3

120 parts styrene, 80 parts dehydrated castor oil polymerised to a viscosity at 25° C. of 45 poises and 40 parts linseed stand oil polmerised to a viscosity at 25° C. of 40 poises were mixed and heated under reflux in the presence of solvent with the following results:

Using xylol as the solvent, and with a quantity thereof amounting to 120 parts, the mixture was first heated for 4¼ hours, whereupon a further 120 parts of xylol were added to the mixture and the whole heated for a further 2½ hours, the viscosity of the product finally obtained at the end of the second heating period being 14 minutes as measured at 25° C. in the Ford No. 4 cup.

On the other hand a mixture containing the same quantities of reactants but with the initial addition thereto of 240 parts of xylol was heated for 24 hours, after which time the product finally obtained gave a viscosity of 140 seconds as measured at 25° C. in the Ford No. 4 cup.

Both the final products obtained in the manner described above yielded satisfactory clear and quick drying films.

It is also to be remarked that in carrying out the reaction between the aromatic vinyl hydrocarbon and the partially polymerized polyhydric esters there may be used, to accelerate the preparation of the final product, catalysts normally employed in the polymerisation of aromatic vinyl hydrocarbons, suitable catalysts for this purpose being for example benzoyl peroxide or air.

In further illustration of methods of carrying the present invention into effect there are given below some additional examples, in which the parts mentioned are all by weight.

Example 4

125 parts of acid refined linseed oil polymerised to a viscosity at 25° C. of 30 poises and 125 parts of dehydrated castor oil polymerised to a viscosity at 25° C. of 45 poises were dissolved in 500 parts of xylol in a 2-litre glass flask. 250 parts of monomeric styrene were then added and the whole mixture heated under a reflux condenser for 12 hours to a final viscosity at 25° C. of 90 seconds in the Ford No. 4 cup. On determining the percentage of combined styrene in the interpolymer by the increase in solids of the reaction mixture the interpolymer was found to consist of 50 per cent styrene and 50 per cent of oil. The solution at this point was perfectly clear; on adding to the solution a naphthenate drier to give 0.004 per cent cobalt and 0.01 per cent lead based on the oil it was found that films flowed from this product dried to a hard coherent durable film in two hours at room temperatures.

Example 5

185 parts of phthalic anhydride, 107 parts of 98 per cent glycerine and 279 parts of linseed oil fatty acids were heated in a glass 2-litre flask to 260° C. in one hour and held for six hours at that temperature, when the product gave an acid value of 20. The resulting partially polymerised mixed ester was then dissolved in 750 parts of xylol and 250 parts of monomeric styrene. Heating was continued under a reflux condenser at 140° C. for 20 hours, when the product obtained gave a viscosity of 30 seconds in the Ford No. 4 cup at 25° C. On determining the percentage of combined styrene in the interpolymer by the increase in non-volatile content of the reaction mixture the interpolymer was found to consist of 32.5 per cent styrene and 67.5 per cent polymerized mixed ester. After adding to the xylol solution of the interpolymer so obtained naphthenate driers to give 0.008 per cent cobalt and 0.02 per cent lead based on the interpolymer it was found that films flowed from this product dried in 2 hours to a tough flexible film.

The products produced by the process according to the present invention are solutions from which the solvent can be removed if desired to produce materials ranging from balsams to solid materials, and the speed of drying of films produced therefrom depends upon the nature and percentage of the various constituents of the final product obtained.

By the present process there can be obtained products which, as contrasted with polystyrene, are specially useful for the production of coating compositions such as paints owing to the possibility of their conversion to the insoluble state. The new products are also useful as a basis for stove enamels using low temperatures. Other applications of products manufactured in accordance with the invention include aircraft and motor-car finishes, electrical insulating materials, adhesive materials, moulded compositions and laminated materials.

Some features of special interest in connection with the present invention are the successful use of turpentine and white spirit as solvents and, as distinct from earlier processes, the success that has been obtained in utilising the non-frosting oils with styrene in the manufacture of the new products. Other points to be noted are the excellent durability, improved initial colour and colour retention of films formed from coating compositions containing interpolymers produced by the methods according to the invention.

What we claim and desire to secure by Letters Patent of the United States is:

1. The process which comprises interpolymerizing by heating a reaction mixture the reactants of which consist of styrene, and an approximately equal proportion of a mixture of partially polymerized dehydrated castor oil having a viscosity of from 11 to 45 poises measured at 25° C. and partially polymerized linseed oil having a viscosity of from 30 to 40 poises measured at 25° C., until there is produced a clear, soluble stable product which is capable of air drying to the insoluble state.

2. The process which comprises interpolymerizing by heating a reaction mixture the reactants of which consist of styrene, and an approximately equal proportion of a mixture of two parts of partially polymerized dehydrated castor oil having a viscosity of from 11 to 45 poises measured at 25° C. and one part of partially polymerized linseed oil having a viscosity of from 30 to 40 poises measured at 25° C., until there is produced a clear, soluble, stable product which is capable of air-drying to the insoluble state.

3. The process which comprises interpolymerizing by heating a reaction mixture the reactants of which consist of styrene, and an approximately equal proportion of a mixture of one part of partially polymerized dehydrated castor oil having a viscosity of from 11 to 45 poises measured at 25° C. and one part of partially polymerized linseed oil having a viscosity of from 30 to 40 poises measured at 25° C., until there is produced a clear, soluble, stable product which is capable of air-drying to the insoluble state.

4. The product of the process of claim 1.
5. The product of the process of claim 2.
6. The product of the process of claim 3.

LESLIE ERNEST WAKEFORD.
DONALD HELMSLEY HEWITT.